United States Patent
Matsuda et al.

(10) Patent No.: US 6,372,367 B1
(45) Date of Patent: Apr. 16, 2002

(54) MAGNETIC RECORDING MEDIUM, METHOD FOR PRODUCING THE SAME AND MAGNETIC RECORDING APPARATUS USING THE SAME

(75) Inventors: Yoshibumi Matsuda, Hiratsuka; Yotsuo Yahisa, Odawara; Hiroyuki Suzuki, Fujisawa; Koji Sakamoto; Yoko Ogawa, both of Odawara; Hiroshi Tani, Kanagawa-ken; Susumu Funamoto; Akira Kato, both of Odawara; Yuzuru Hosoe, Hino, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/309,580

(22) Filed: May 11, 1999

(30) Foreign Application Priority Data

May 12, 1998 (JP) .......................... 10-128473

(51) Int. Cl.⁷ .............. B32B 3/02; G11B 5/66; G11B 5/70
(52) U.S. Cl. .................. 428/694 TS; 428/694 TR; 428/65.3; 428/65.6; 428/65.7
(58) Field of Search ............ 428/900, 694 TS, 428/694 TP, 694 TR, 65.3, 65.6, 65.7; 360/113, 110

(56) References Cited

U.S. PATENT DOCUMENTS

| | | | | |
|---|---|---|---|---|
| 4,652,499 A | * | 3/1987 | Howard ........................ | 428/641 |
| 5,438,747 A | * | 8/1995 | Krounbi et al. ........... | 29/603.16 |
| 5,441,788 A | * | 8/1995 | Bloomquist et al. ...... | 428/65.6 |
| 5,480,733 A | * | 1/1996 | Okumura et al. ......... | 428/694 T |
| 5,646,805 A | * | 7/1997 | Shen et al. ............... | 360/113 |
| 5,939,170 A | * | 8/1999 | Nishimori et al. ........ | 428/141 |
| 5,939,202 A | * | 8/1999 | Ataka et al. .............. | 428/457 |

FOREIGN PATENT DOCUMENTS

| | | |
|---|---|---|
| JP | 4-62413 | 10/1992 |
| JP | 2547651 | 8/1996 |
| JP | 10-74314 | 3/1998 |
| JP | 10-143865 | 5/1998 |
| WO | WO98/12698 | 3/1998 |

* cited by examiner

Primary Examiner—Paul Thibodeau
Assistant Examiner—Holly C. Rickman
(74) Attorney, Agent, or Firm—Mattingly, Stanger & Malur, P.C.

(57) ABSTRACT

A magnetic recording medium having a high reliability of durability against frictional motion can be ensured even in a severe rubbing test, while a low noise characteristic important for achievement of high-density recording is kept. A first underlayer made of an alloy containing Co or Ni as a main component and containing Cr and Zr simultaneously is formed over a base, a second underlayer having a rough surface is formed on the first underlayer, a third underlayer made of an alloy containing Ni as a main component and containing Cr and Zr simultaneously is formed over the second underlayer, a fourth underlayer as a film for controlling crystalline orientation is formed on the third underlayer, a magnetic layer made of an alloy containing cobalt a main component is formed over the fourth underlayer, and a protective film containing carbon as a main component is formed on the magnetic layer.

6 Claims, 6 Drawing Sheets

MAGNETIC DISK MEDIUM NO. TO BE SUBJECTED TO EVALUATION

| THIRD UNDERLAYER | SEEK TIMES BEFORE OCCURRENCE OF CRASHING | |
|---|---|---|
| | FIRST TIME | SECOND TIME |
| Ni-20at.%Cr-10at.%Zr | MORE THAN 200 TIMES | MORE THAN 200 TIMES |
| Co-30at.%Cr-10at.%Zr | 19 TIMES | 32 TIMES |
| NON | 12 TIMES | 15 TIMES |

| MAGNETIC LAYER THICKNESS (nm) | 21 | 17 | 15 |
|---|---|---|---|
| Brt (Gum) | 89 | 70 | 62 |
| Hc (kOe) | 2.48 | 2.4 | 2.29 |
| S* | 0.72 | 0.68 | 0.66 |
| S | 0.76 | 0.73 | 0.74 |
| $S_{LF}/N_d$ | 25.5 | 25.7 | 25.9 |

MAGNETIC RECORDING MEDIUM, METHOD FOR PRODUCING THE SAME AND MAGNETIC RECORDING APPARATUS USING THE SAME

BACKGROUND OF THE INVENTION

1. Field of the Invention

The present invention relates to a magnetic recording medium having a large information recording capacity and a magnetic recording apparatus using such a magnetic recording medium. Particularly, the invention relates to a magnetic recording medium adapted for high-density magnetic recording, a method for producing such a magnetic recording medium, and a small-sized large-capacity magnetic recording apparatus using such a magnetic recording medium.

2. Description of Related Art

The demand for increase in the capacity of a magnetic recording apparatus has become higher and higher. An electromagnetic inductive magnetic head utilizing the voltage change caused by a flux change with the passage of time has been used as a related-art magnetic head. This head has an advantage that both recording and reproducing can be performed by one head. On the other hand, recently, a combination type head in which a recording head and a reproducing head are provided separately so that use of a more highly sensitive magneto-resistance effect type head for reproduction has been progressed rapidly. In order to improve the sensitivity of a magneto-resistance effect type head utilizing the change of electric resistance of a head device caused by the change of magnetic flux leaked from a medium, a still more highly sensitive head utilizing a very large change of magnetic resistance (a giant magneto-resistance effect or a spin valve effect) generated in magnetic layers of the type having a plurality of magnetic layers laminated through a non-magnetic layer has been put into practical use. This head utilizes a phenomenon in which the direction of relative magnetization of magnetic layers having the non-magnetic layer therebetween is changed in accordance with the magnetic field leaked from the medium to change magnetic resistance.

On the other hand, factors necessary for increasing the density of the magnetic recording medium are (1) establishing both surface flatness required by low floating of the magnetic head and avoidance of a head sticking phenomenon at the time of stopping the magnetic head, with greater improvement of durability against frictional motion, (2) low noise characteristics and (3) achievement of stable magnetic characteristics with a large process margin.

First, as a countermeasure to the head sticking phenomenon, Japanese Patent No. 2064981 (JP-B-4-62413) discloses a magnetic recording medium having an underlayer, a magnetic layer and a protective layer formed successively on a non-magnetic support, wherein: a landing zone is provided in the magnetic recording medium; a roughness forming layer for forming roughness on a surface of the protective film layer in the landing zone toward the magnetic layer is provided between the non-magnetic support and the underlayer in the landing zone; and the roughness forming layer has larger surface roughness than that of a main surface of the non-magnetic support and has a grain boundary of a film material. That is, the Japanese Patent No. 2064981 discloses a configuration in which a rough layer due to the grain boundary generated at the time of formation of a thin film of aluminum, or the like, is provided under the magnetic film to thereby give roughness to the surface of the protective film.

Further, JP-B-2547651 discloses a magnetic recording medium having a magnetic layer interposed between a protective layer and a surface of a non-magnetic support coated with a roughness-forming substance for forming roughness on the surface of the support, wherein: the roughness-forming substance is a single metal or an alloy having a melting point not higher than 1,100° C.; a structure of a large number of islands discontinuous in the plane direction of the surface of the non-magnetic support is formed on the surface of the non-magnetic support by the roughness-forming substance; an underlayer for the magnetic layer is provided between the non-magnetic support and the magnetic layer; and an oxygen trap layer is provided between the non-magnetic support and the underlayer. That is, the above JP-B-2547651 discloses a configuration in which a roughness-forming layer having a discontinuous island structure of aluminum, or the like, is provided. The above JP-B-2547651 further describes that the oxygen trap layer prevents the rise of oxygen from the nonmagnetic support to thereby improve the crystallinity of the undercoat film and improve the magnetic characteristic on page 3, left column, lines 26–28. That is, the oxygen trap layer is provided between the non-magnetic support and the underlayer in order to improve the magnetic characteristic of the magnetic film.

As disclosed in PCT Patent Application PCT/JP96/02720 (WO 98/12698), the inventors of the present invention have found that it is easy and controllable, for forming a roughness-forming layer, to use a method of forming discontinuous island-like protrusions of an intermetallic compound by sputtering by use of a target of a peritectic alloy type composition having an intermetallic compound phase of aluminum and chrome, or the like.

Further, as described in JP-A-10-74314, it has been found that not only can the magnetic characteristic of the magnetic film be improved, but also medium noise, which is a problem particularly in a magneto-resistance effect type head, can be reduced if a non-magnetic alloy layer containing Co as a main component is provided under the underlayer. It has been further found that the non-magnetic alloy layer containing Co as a main component is excellent also in adhesion to a glass substrate which has been often used as a countermeasure to a shock on the magnetic disk device in recent years.

SUMMARY OF THE INVENTION

In order to improve the characteristic of the aforementioned magnetic recording medium, the inventors of the present invention have made experiments. As a result, it has been found that medium noise can be reduced more stably if a non-magnetic alloy layer containing Co as a main component is impregnated with Cr or Zr having a high tendency to be oxidized, and the surface of the non-magnetic alloy layer is exposed to an oxygen atmosphere to be slightly oxidized, as described in Japanese Patent Application 8-292451 (JP-A-10-143865). All the contents of this document are incorporated here by reference.

A magnetic disk was produced by the aforementioned technique as follows. A Co—Cr—Zr alloy layer was provided as a first underlayer. A rough layer of an intermetallic compound was provided, as a second underlayer on the first underlayer, by sputtering a target of an Al—Cr composition. A Co—Cr—Zr alloy layer was provided as a third underlayer on the second underlayer. After the surface of the third underlayer was slightly oxidized, a fourth undercoat film and a magnetic film were formed to produce a magnetic disk. As a result, it was however found that crashing (a phenomenon that the magnetic layer is worn out) occurred in a friction durability test under a severe condition that dust was introduced. The terminology "friction durability test under the condition that dust is introduced" (hereinafter referred to as "dust introduction test") means a test for measuring the number of seeking times to cause crashing when a seeking operation of the magnetic head is repeated after about 0.1 g of alumina particles each having a size of about 2 μm is sprinkled onto the magnetic disk surface in the magnetic disk device.

To improve the aforementioned problem, a first object of the present invention is to provide a magnetic recording medium in which, while the low noise characteristic which is important for achieving high recording density is kept, high reliability of frictional durability can be secured even in the aforementioned severe friction durability test.

A second object of the present invention is to provide a method for producing such a magnetic recording medium.

To attain the foregoing objects, the inventors of the present invention have tested various materials for forming first, second and third underlayers. As a result, it has been found that a good result is obtained if an Ni—Cr—Zr alloy layer containing Ni as a substitute for Co is used as the third underlayer. It has been further found that a good result is obtained also in the case where a Co—Cr—Zr alloy layer or an alloy containing Ni as a main component and also containing Cr and Zr is used as the first underlayer. The reason why a good result is obtained if an Ni—Cr—Zr alloy layer instead of a Co—Cr—Zr alloy layer is used as the third underlayer is inferred as follows. This is because the Ni—Cr—Zr alloy layer is more highly amorphous than the Co—Cr—Zr alloy layer so that the former is higher in toughness as a thin film than the latter. Further, when a fourth underlayer is formed on the third underlayer to serve as a film for controlling crystalline orientation, a magnetic layer having a good recording/reproducing characteristic in a high-density recording region can be formed on the fourth underlayer.

The present invention was attained as described above. According to an aspect of the present invention, a magnetic recording medium comprises a base; a first underlayer formed over said base; a second underlayer formed on said first underlayer and having a plurality of protrusions with a predetermined density; a third underlayer formed over said second underlayer and including an alloy containing Ni as a main component, at least one element selected from a first group consisting of Cr, Ti, V, Mo and Nb and at least one element selected from a second group consisting of Zr, Ta, Hf, Y and W; a fourth underlayer formed on said third underlayer; and a magnetic layer formed over said fourth underlayer.

According to another aspect of the present invention, a method for producing a magnetic recording medium comprises the steps of: (a) forming a first underlayer over a base by sputtering; (b) heating said base having said first underlayer after step (a); (c) forming a second underlayer on said first underlayer so that said second underlayer has a plurality of protrusions with a predetermined density; (d) forming a third underlayer over said second underlayer so that said third underlayer includes an alloy containing Ni as a main component, at least one element selected from a first group consisting of Cr. Ti, V, Mo and Nb, and at least one element selected from a second group consisting of Zr, Ta, Hf, Y and W; (e) heating said base formed with said first, second and third underlayers, after step (d); (f) forming a fourth underlayer on said third underlayer; and (g) forming a magnetic layer over said fourth underlayer.

DETAILED DESCRIPTION OF THE EMBODIMENTS

Embodiments of the present invention will be described below in detail with reference to the drawings.

Embodiment 1

Figure 1:
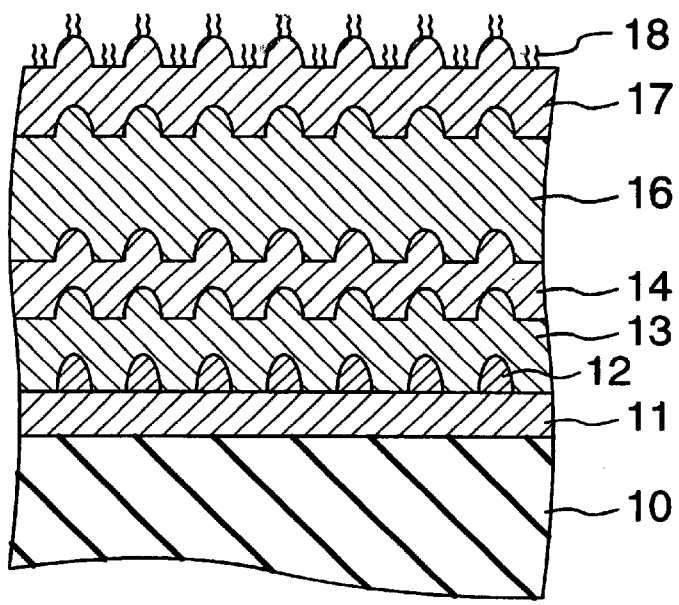
FIG. 1 is a sectional view schematically showing a magnetic recording medium according to an embodiment of the present invention.
Figure 2:
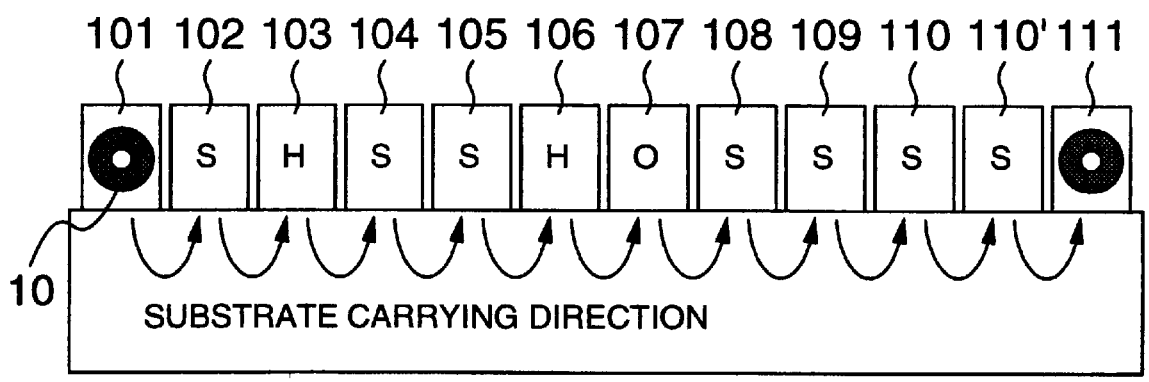
FIG. 2 schematically shows the chamber configuration of a sputtering apparatus used for production of a magnetic recording medium according to an embodiment of the present invention.

FIG. 1 is a sectional structural view of a magnetic recording medium as an embodiment of the present invention. A soda-lime glass substrate of a 2.5 inch type having a thickness of 0.635 mm and having a surface chemically reinforced was used as a base or a substrate 10. After the substrate was cleaned, the following multi-layer film was formed on the substrate in a tact of 9 seconds by a sheet form type sputtering apparatus (MDP250B) made by Intevac Corp. The sputtering apparatus had a chamber configuration or a station configuration as shown in FIG. 2. In FIG. 2, the reference character "S" designates a chamber for sputtering;. "H", a chamber for heating; and "O" a chamber for oxidation. First, the substrate 10 was moved from an antechamber 101 to a first underlayer forming chamber 102. In the chamber 102, a first underlayer 11 having a thickness of 27 nm and made of a Co alloy containing 30 atomic % of Cr and 10 atomic % of Zr was formed on the substrate 10. Next, in a first heating chamber 103, the substrate was heated to about 120° C. by a lamp heater. Next, in a second underlayer forming chamber 104, a second underlayer 12 having a rough surface and made of an Al alloy containing 10 atomic % of Cr was form ed on the first underlayer 11. Next, in a third underlayer forming chamber 105, a third underlayer 13 having a thickness of 20 nm and made of an Ni alloy containing 20 atomic % of Cr and 10 atomic % of Zr was formed on the second underlayer 12. Next, in a second heating chamber 106, the substrate was heated to about 270° C. by a lamp heater. Next, in an oxidation chamber 107, the substrate was exposed to an atmosphere of 7 mTorr pressure (21 sccm gas flow rate) of a 99% Ar-1% $O_2$ mixture gas for 3.5 seconds. Next, in a fourth underlayer forming chamber 108, a fourth underlayer 14 having a thickness of 17 nm and made of a Cr alloy containing 20 atomic % of Ti was formed on the third underlayer 13. Next, in a magnetic layer forming chamber 109, a magnetic layer 16 having a thickness of 21 nm and made of a Co alloy containing 21 atomic % of Cr and 7 atomic % of Pt was formed on the fourth underlayer 14. Next, in two protective layer forming chambers 110 and 110', two layers each having a thickness of 6 nm were formed successively, that is, a protective layer 17 having a thickness of 12 nm in total was formed on the magnetic layer 16. Next, the substrate was moved to a completion chamber 111. Finally, the substrate was taken out of the sputtering apparatus and a lubricant containing perfluoroalkyl polyether as a main component was applied onto the protective layer to thereby form a lubricant layer 18 having a thickness of 2 nm.

For the formation of each of the first, second, third and forth underlayers 11, 12, 13 and 14 and the magnetic layer 16, Ar was used as an electric-discharge gas and the gas pressure of Ar was set to be 7 mTorr. Further, for the formation of the protective layer 17 of carbon, Ar was used as an electric-discharge gas and the gas pressure of Ar was set to be 10 mTorr. Although FIG. 1 shows the configuration of layers formed on one side of the substrate, this embodiment provides a case where such a medium is formed on each of the opposite sides of the substrate, that is, layers shown in FIG. 1 are formed successively in this order also on the other side of the substrate.

The magnetic recording medium formed in the aforementioned manner was cut, and the laminated thin film portion was thinned from up and down in a direction perpendicular to the film surface by ion thinning so as to be cone-shaped. Then, the fine structure of the first and third underlayers was observed by using a transmission electron microscope with an acceleration voltage of 200 kV. As a result, the crystal grain size was not larger than 8 nm. Further, a limited view-field diffraction image was photographed. As a result, a halo was observed, and it was confirmed that the medium was substantially amorphous. Further, the surface shape of the medium was evaluated by using an intermittent contact type atomic force microscope. As a result, it was confirmed that protrusions each having a height of about 16 nm were formed with a density of about 400 protrusions per 10 $\mu$m square. The average diameter of the protrusions was about 100 nm. In this evaluation, the surface shape of a 10 $\mu$m×10 $\mu$m region was evaluated while the scanning line was shifted by 20 nm pitch in a direction perpendicular to the scanning direction under the condition that a length of 10 $\mu$m was scanned for about 1 second and data at 512 points were picked up. Further, the value of center-line average surface roughness Ra calculated on the basis of the measured data was 2 nm. Here, the height of the protrusions was defined as a height in a range of from 1% to 99% in a bearing curve. The element distribution of a surface of a sample taken out from the sputtering apparatus without forming any layer above the third underlayer after the formation of layers up to the second underlayer was analyzed. As a result, it was confirmed that the second underlayer in this embodiment was constituted by protrusions which existed substantially discretely in a film surface, as shown in FIG. 1. The magnetic characteristic of the magnetic disk medium obtained thus was evaluated by using a vibrating sample magnetometer. As a result, the coercivity was 2.43 kOe, the coercive squareness was 0.72, and the product (Br×t) of the thickness t of the magnetic layer and the residual magnetic flux density Br was 85 Gauss·$\mu$m.

Other than chemically reinforced aluminosilicate, ceramics such as soda-lime glass, silicon, borosilicate glass, or the like; glass-glazed ceramics; a rigid-body substrate such as an Al—Mg alloy substrate electrolessly plated with Ni—P, a glass substrate electrolessly plated with Ni—P; or the like; can be used as the substrate 10.

In this embodiment, an alloy containing Co or Ni as a main component and containing Cr and Zr simultaneously is used as a material for forming the first underlayer. When the first underlayer is made of an alloy containing Co or Ni as a main component, a high strength of adhesion to the substrate is obtained. Although it is preferable that the magnetization of the first underlayer is negligibly small in view of the reproducing head, the ferromagnetic component Co or Ni contained in the first underlayer can be effectively reduced if Cr is added as an additional element. Further, the addition of Cr preferably contributes to an improvement of reliability as to anticorrosion. Further, if Zr is added, the alloy film can be made amorphous without any deterioration of the anticorrosion property.

Further, preferably, the first underlayer is a layer of an alloy which is microcrystalline or substantially amorphous. When the first underlayer is formed as a microcrystalline or substantially amorphous layer, mass production can he made while the surface shape of the second underlayer formed on the first underlayer and having a rough surface is controlled stably. This is because the surface energy and shape of the first underlayer under the second underlayer can be made substantially constant regardless of the substrate. The terminology "microcrystalline" means that a crystal has a crystal grain size not larger than 8 nm. The terminology "substantially amorphous" means that the diffraction pattern is observed as a halo when a selected area diffraction pattern is photographed by using a transmission electron microscope. Such a fine structure of layers constituting the magnetic recording medium can be evaluated as follows. A sample thinly cut from the substrate in a direction perpendicular to the substrate, or a s ample having the substrate thinned by mechanical polishing, is further thinned vertically from upper and lower sides of the sample by means of ion thinning. Then, the thinned portion is observed by using a transmission electron microscope of high magnification or the pattern of a diffract ion ring is observed in a selected area field diffraction pattern.

When the second underlayer having a rough surface is formed on the first underlayer, sticking between the medium surface and the magnetic head slider can be reduced. Further, as the specific surface area increases, adhesive strength between layers above the second underlayer can be improved. The second underlayer may be formed so as to have continuous portions between adjacent protrusions. However, in the case where the second underlayer having a rough surface is constituted by substantially discrete protrusions formed under the condition that Volmer-Weber type three-dimensional cores thinner than the thickness for forming an indiscrete film are generated, the third underlayer is laminated so as to contact not only with the second underlayer but also with the first underlayer. Accordingly, when the third underlayer and the first underlayer are formed of the same kind of material, the adhesive strength can be improved more greatly. The second underlayer is made of Al or an alloy containing Al as a main component. Particularly an Al alloy containing 5 to 30 atomic % of Cr is preferred because the height, diameter and areal density (the number of protrusions per unit area) of protrusions substantially discrete in the inward direction of the film surface can be controlled easily if the temperature at the time of the formation of the second underlayer is controlled.

Figures 3, 4:
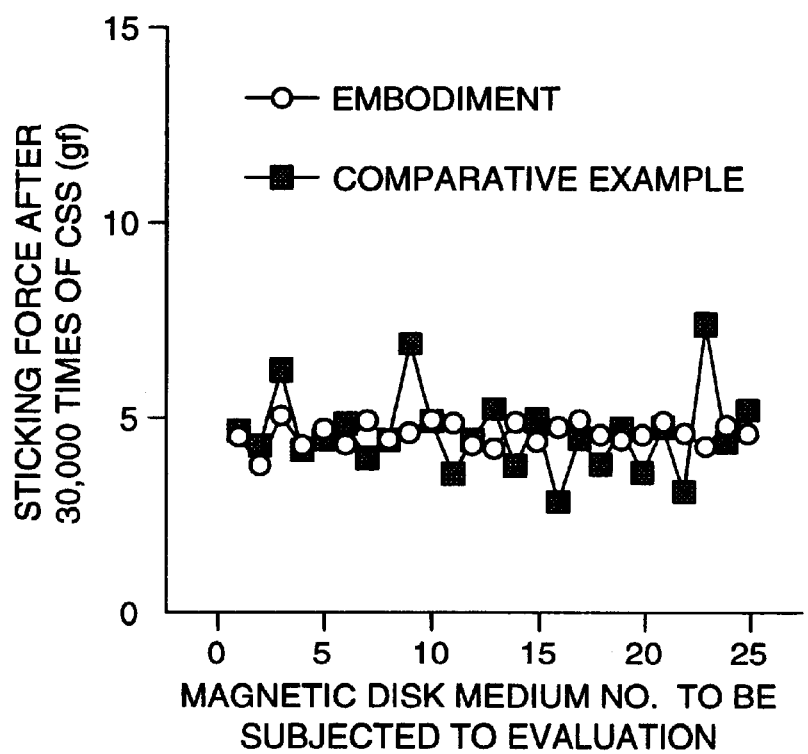
FIG. 3 shows variations in stickness after magnetic recording medium samples are subjected to CSS 30,000 times.
FIG. 4 shows results of measurement of the number of seeking times before crashing is caused in each of the magnetic recording medium samples.

Further, after a magnetic head slider known by those skilled in the art was subjected to a contact start and stop (CSS) operation 30,000 times on the surface of the disk medium, the stickiness between the magnetic head slider and the disk medium was measured. This measurement was applied to 25 disk medium samples to evaluate variation in the measurement. A result of the evaluation is shown in FIG. 3. As a comparative example, a result of a magnetic disk medium formed in the same condition as that in this embodiment, except that the first underlayer is not formed, is also shown in FIG. 3. As shown in FIG. 3, variation in stickiness of the medium in this embodiment was less than that in the comparative example; that is, a good result was obtained in this embodiment. In the case where the second underlayer was formed with no first underlayer, the following facts were clear. Although the medium surface became rough, it was difficult to control the shape of protrusions because both variation in the height of the protrusions and variation in the size of the protrusions were larger by tens of percent than those in the case where the first underlayer was formed. It is considered that the difficulty in shape control is caused by the change of surface energy because contaminants such as water, etc. adsorbed in the surface of the substrate in a cleaning process may remain even after a drying process following the cleaning process. It is considered that water adsorbed thus cannot be removed perfectly even by heating in a vacuum because the water forms hydrates together with oxides, or the like, constituting glass to thereby cause a firm adsorptive relation.

Further, a magnetic disk device which will be described later as Embodiment 7 was produced by use of the medium of this embodiment. About 0.1 g of alumina particles with a size of about 2 μm was sprinkled on the magnetic disk surface. A seeking operation of the magnetic head was repeated 200 times and the number of seeking times reaching crashing was measured. A result of the measurement is shown in FIG. 4.

For the purpose of comparison, FIG. 4 also shows a result of the measurement of a medium which has the same film structure as that in this embodiment except that only the third underlayer is changed to Co-30 at. % Cr-10 at. % Zr (thickness 25 nm) and a result of the measurement of a medium in which the third underlayer is removed from this embodiment. Further, two medium samples were prepared for each condition. The samples were evaluated one by one. That is, evaluation was performed twice in total with respect to each condition. In the medium having the third underlayer of Co-30 at. % Cr-10 at. % Zr and in the medium having no third underlayer formed, crashing occurred whenever seeking was repeated in a range of from about 12 times to about 32 times. On the contrary, in the medium of this embodiment, crashing did not occur even after seeking was performed 200 times (shown as "200 times or more" in FIG. 4); that is, a good result was obtained.

The third underlayer is preferably a layer of an alloy which is microcrystalline or substantially amorphous. When the third underlayer is a microcrystalline or substantially amorphous layer the same as the first underlayer, improvement is made on the adhesive strength of the third underlayer to a surface of the first underlayer which is not covered with protrusions substantially discrete in the inward direction of the film surface. Further, when the third underlayer is made of a microcrystalline or substantially amorphous film, not only crystal particles of the fourth underlayer formed on the third underlayer can be made fine, but also crystalline orientation can be controlled. In such a manner, not only crystal particles constituting the magnetic layer can be controlled to be a fine size. suitable for noise reduction, but also the direction of magnetic anisotropy of the magnetic layer can be controlled. As described above, an alloy containing Ni as a main component is preferably used as a material for the third underlayer. Further, when Cr and Zr are added simultaneously so that the third underlayer is made of the material having the same kinds of elements as the first underlayer, the adhesive strength of the third underlayer to the surface of the first underlayer is enhanced more greatly so that durability against CSS can be improved. Cr has an effect of reducing the ferromagnetic component of Ni effectively and an effect of improving reliability of anticorrosion. Zr has an effect of making an alloy film amorphous without any deterioration of the anticorrosion property.

Incidentally, even in the case where Cr added to the first and third underlayers is replaced by Ti, V, Mo or Nb, an effect substantially equal to that in the case of Cr is obtained. Further, when Zr added to the first and third underlayers is replaced by Ta, Hf, Y or W, an effect substantially equal to that in the case of Zr is obtained. Further, the thickness of the first underlayer is preferably in a range of from 5 nm to 50 nm, both inclusively. If the thickness is smaller than 5 nm, it is difficult to suppress the influence of the adsorbate on the surface of the substrate because the first underlayer may be grown up, not like a continuous thin film, but like islands. If the thickness is larger than 50 nm, efficiency in mass production is undesirably lowered. The thickness of the third underlayer is preferably in a range of from 5 nm to 50 nm, both inclusive. If the thickness is smaller than 5 nm, it is difficult to control crystallinity and crystalline orientation of the fourth underlayer and the magnetic layer formed over the third underlayer because the third underlayer may be grown up like islands. If the thickness is larger than 50 nm, efficiency in mass production is undesirably lowered.

The fourth underlayer is used as an undercoat film for controlling the crystalline orientation of the magnetic layer formed on the fourth underlayer. When the third underlayer is formed under the fourth underlayer, the influence of the diffusion of atoms from the second underlayer to the fourth underlayer can be reduced greatly so that the crystallinity of the fourth underlayer can be improved. Further, when the third underlayer is formed as a substantially amorphous layer containing the same elements as the first underlayer, the adhesive strength of the third underlayer to the first underlayer is enhanced so that high performance against frictional motion is obtained. Further, the surface of the third underlayer does not have periodic atomic arrangement over a long distance. Accordingly, not only crystal particles of the fourth underlayer formed on the third underlayer can be made fine, but also the crystalline orientation of the fourth underlayer can be controlled. In such a manner, not only the mean particle size of crystals constituting the magnetic layer can be controlled to be a fine size of 15 nm or less suitable for noise reduction, but also the direction of the easy axis of magnetization can be controlled to be parallel with the film surface suitable for in-plane magnetic recording.

A non-magnetic thin film of a Cr-group alloy such as Cr—V, Cr—Mo, Cr—Si, or the like, forming an irregular solid solution capable of being (100)-oriented with good crystalline matching to the magnetic film can be used as the fourth underlayer. A Co—Cr—Pt alloy can be used as the magnetic layer or a multi-component alloy containing Co as a main component, Pt for enhancing coercivity, and additives such as Cr, Ta, $SiO_2$, Nb, etc. for reducing medium noise can be used as the magnetic layer. Particularly, addition of Ta, Nb, V or Ti is preferable because the melting point of the target can be reduced so that the composition separation of the magnetic film containing Cr can make rapid progress. A Co-group alloy to which Pt, Ni or Mn is added is practical because the lowering of magnetic anisotropic energy is suppressed in comparison with other additional elements. Specifically, alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$, etc. can be used other than Co—Cr—Pt. Further, a protective film containing carbon as a main component is preferably provided on the magnetic layer in order to improve reliability of durability against-frictional motion.

The crystalline structure of the fourth underlayer is preferably a body-centered cubic structure of non-magnetic metals. For example, there is used a thin film of a non-magnetic Cr-group alloy, or the like, for forming a solid solution which is (100)-oriented so that orientation with good crystalline matching to the magnetic film is expected. The terminology "(100) orientation" used herein means orientation in which the (100) plane of crystal is parallel with the surface of the substrate. As a material for forming the fourth underlayer, a Cr—Ti alloy, a Cr—Ti—Mo alloy, etc. can be used other than the aforementioned alloy. The thickness of the fourth underlayer is preferably in a range of from 5 nm to 50 nm, both inclusive. If the thickness is smaller than 5 nm, it is difficult to control the crystallinity and crystalline orientation of the magnetic layer formed on the fourth underlayer. If the thickness is larger than 50 nm, efficiency in mass production is undesirably lowered.

Further, the concentration of cobalt and platinum in the constituent elements of the magnetic layer is preferably 80 atomic % or less. The coercivity measured with a sample vibration type magnetometer under application of a magnetic field into the film surface is preferably 160 kA/m or higher. This is because good magnetic recording performance is obtained in a high recording density region. However, if the coercivity is higher than 320 kA/m, the overwrite characteristic is lowered. Accordingly, the medium preferably has a coercivity that can be controlled within a range permitting overwriting. Further, in order to improve reliability of durability against frictional motion, preferably, a protective film (layer) containing carbon as a main component is formed on the magnetic layer and a lubricant layer is formed on the protective layer.

As for production of the magnetic recording medium, the underlayers are preferably formed respectively in independent vacuum tanks to enhance controllability of the electric discharge atmosphere. When the first underlayer is formed over the substrate, the influence of the adsorbate on the surface of the substrate as a cause of the change of the shape of protrusions of the second underlayer can be reduced so as to be ignorable. Further, when the substrate is heated after the first underlayer is formed, surface energy can be controlled to be in a range suitable for generation of heterogeneous cores necessary for formation of protrusions of the second underlayer without having any influence of the adsorbate on the surface of the substrate. Preferably, when a microcrystalline or substantially amorphous film of the metal—metal type is used as the first underlayer, the adsorbate on the surface of the substrate can be efficiently covered with a chemically active element.

Generally, a problem of emitted gas may be associated with a heating step provided as a post-step. In this producing method, however, the emitted gas source has been already substantially sealed when the first underlayer has been formed. Accordingly, the emitted gas is suppressed to a practically tolerable level. After the third underlayer is formed on the second underlayer, heating is performed again in an adjacent vacuum tank and the fourth underlayer is then formed in a further adjacent vacuum tank. In such a manner, the crystallinity, crystalline orientation and crystal particle size of the magnetic layer formed on the fourth underlayer can be controlled to reduce medium noise. When the magnetic layer and a protective layer which contains carbon as a main component are successively formed on the aforementioned multilayer undercoat film and the resulting medium is taken out while the pressure is returned to an atmospheric pressure, the formation of a multilayer film concerning a series of dry process is terminated. Incidentally, sputtering is preferably used as means for forming the first or third underlayer of a microcrystalline or substantially amorphous film between the substrate and the magnetic layer. This is because the range of element types allowed to be deposited by means of sputtering is wide in comparison with means of plating. Accordingly, a thin film containing a large amount of Cr can be formed though it can hardly be formed by means of plating. Further, sputtering has an advantage, compared to vacuum vapor deposition, in that not only is the adhesive strength high between the formed thin film and the substrate or between adjacent thin films, but also the surface characteristic of the thin film can be controlled in a wide range in accordance with the temperature of the substrate, the pressure of sputtering electric discharge gas and the atmosphere of electric discharge at the time of the formation of the thin film. After the second underlayer is formed, the third underlayer is indiscretely formed in an adjacent vacuum tank without any intentional heating. In such a manner, preferably, not only is the adhesive strength improved, but also the dispersion of the constituent elements of the second underlayer into the fourth underlayer for controlling crystalline orientation is suppressed. Further, when the surface of the third underlayer is exposed to an atmosphere containing oxygen after the third underlayer is formed, medium noise can be reduced stably. This process of exposing the surface of the third underlayer to an oxygen atmosphere can be performed just after the third underlayer is formed or after the substrate is heated again after the formation of the third underlayer. Further, when the substrate is cooled before a protective layer containing carbon as a main component is formed, a protective film excellent in reliability of durability against frictional motion can be formed. The substrate may be cooled by making inert gas such as nitrogen, or the like, flow in a vacuum tank or by providing a water-cooling chill plate.

Embodiment 2

Figures 5, 6:
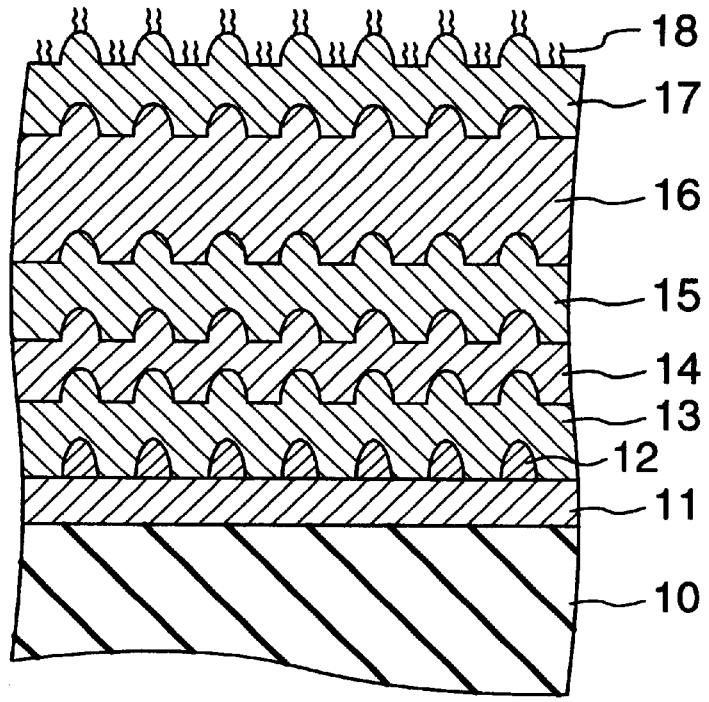
FIG. 5 is a sectional view schematically showing a magnetic recording medium according to another embodiment of the present invention.
FIG. 6 shows the magnetic characteristic of a magnetic recording medium according to the present invention.

FIG. 5 is a sectional structural view showing a magnetic recording medium in this embodiment. The magnetic recording medium has a structure in which the medium of Embodiment 1 shown in FIG. 1 is further provided with a fifth underlayer 15 between the fourth underlayer 14 and the magnetic layer 16. After underlayers up to the third underlayer 13 were formed in the same manner as that in Embodiment 1, a Cr layer having a thickness of 10 nm and a layer of a Cr-20 at. % Ti alloy having a thickness of 10 nm were formed by sputtering as the fourth underlayer 14 and the fifth underlayer 15, respectively. After that, a magnetic layer 16, a protective layer 17 and a lubricant layer 18 are formed on the layer 15 in the same manner as that in Embodiment 1. The coercive squareness of the medium obtained thus was about 0.78, which was about 0.06 higher than that of the medium of Embodiment 1. That is, a relatively high output was obtained in a high-density recording region. Further, when the fifth underlayer 15 having a different lattice constant was formed and laminated on the fourth underlayer 14, the peel strength in the shearing direction at CSS time was enhanced as an effect of lamination of a large number of thin films. Accordingly, the life before occurrence of crashing due to repetition of CSS was elongated by about 10%.

An Al-10 at. % Cr alloy was used as a material for forming the second underlayer. Besides, Al or an alloy such as an Al-(5–20) at. % Cr alloy in which the concentration of Cr is changed in a range from 5 atomic % to 20 atomic %, an Al-(7–29) at. % Co alloy, an Al-(3–25) at. % Mo alloy, an Al-(3–25) at. % V alloy, an Al-3% Cu-1.5% Si alloy used as a semiconductor wiring material, or the like, was used as the material for forming the second underlayer. Further, high-melting elements such as Cr, Nb, Mo, Ta, W, etc. were used for forming the second underlayer. As the temperature of the support was raised, the surface roughness increased as shown in FIG. 3 in JP-A-62-256215. As the temperature of the substrate was raised, cores were grown. As a result, the number of protrusions decreased. Further, this tendency strongly depended on the magnitude of surface diffusion at the time of the growth of the thin film. In the Al-(5–20) at. % Cr alloy having its melting point raised as the concentration of elements added to Al increased, it became clear that the number of protrusions decreased as the concentration of elements added to Al increased. Also in the Al-(7–29) at. % Co alloy, the Al-(3–25) at. % Mo alloy or the Al-(3–25) at. % V alloy in which the increase of the melting point was expected as described above, the density of protrusions was changed. On the contrary, in the case where the second underlayer 12 having a rough surface was formed of high-melting elements such as Cr, Nb, Mo, Ta and W, the process margin was expected to increase in accordance with the change of the temperature of the substrate because the melting point was high. However, it became clear that shape control was difficult in accordance with the quality of vacuum particularly in the case of Ta or W though roughness could be formed. From this result, a relatively low-melting metal such as Cr, Nb or Mo was better than Ta or W as a material for forming protrusions. The aforementioned Al alloy was further better. Particularly in the case where the second underlayer was constituted by protrusions substantially discrete in the film surface as shown in FIG. 5 so that Volmer-Weber type three-dimensional cores thinner than the thickness of a continuous film were generated, the adhesive strength of the second underlayer to the third underlayer was improved and peel strength in the shearing direction at the time of CSS was enhanced because the surface area of the second underlayer was large.

Embodiment 3

Three kinds of magnetic recording media having magnetic layers with thicknesses of 15 nm, 17 nm and 21 nm respectively and having the same configuration as the magnetic recording medium described in Embodiment 1 were produced in the same manner as that in Embodiment 1, except that the three kinds of magnetic recording media were different in the thickness of the magnetic layer.

The fine structure of the first and third underlayers of each magnetic disk medium formed thus was evaluated by using a transmission electron microscope in the same manner as that in Embodiment 1. As a result, the first and third underlayers were substantially amorphous. A friction durability test based on 50,000 times CSS was performed. As a result, in each of the magnetic recording media having magnetic layers with thicknesses of 15 nm, 17 nm and 21 nm respectively, neither magnetic recording medium nor magnetic head was destroyed; that is, high reliability of durability against frictional motion was obtained. FIG. 6 shows the magnetic characteristic of each of the magnetic recording media.

By thinning the magnetic layer, each of the magnetic recording media becomes suitable for high-density recording. The in-plane coercivity Hc was substantially in a range from 2.3 kOe to 2.5 kOe. The coercive squareness S* was in a range from 0.66 to 0.72, that is, about 0.7. The squareness ratio S was substantially constant in a range from 0.73 to 0.76. These magnetic characteristics were measured with a sample vibration type magnetometer at 25° C.

Figure 7:
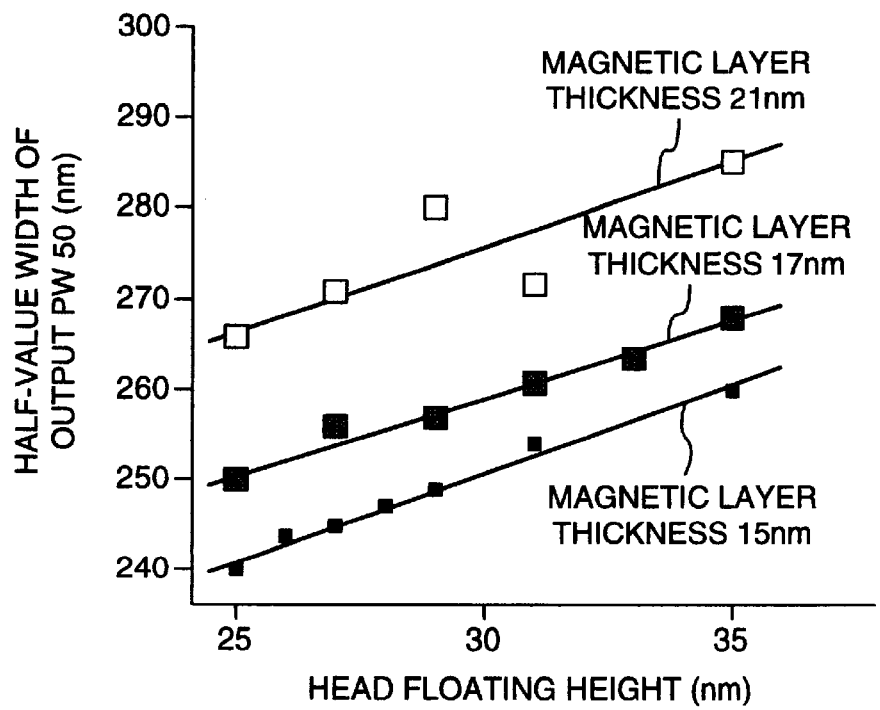
FIG. 7 shows the relation between the half-value width of the head output and the floating height of the head in the case where a magnetic recording medium according to the present invention is used.

The electromagnetic transducing characteristic of each of the magnetic recording media was measured with a magnetic head including a spin-valve type reproducing device with a shield gap length Gs of 0.18 $\mu$m as described in Embodiment 8, and an electromagnetic induction type write device with a gap length of 0.3 $\mu$m. The sense current and write current Iw in the reproducing device were set to be 6 mA and 60 mA respectively. While the rotational speed of the magnetic recording medium (magnetic disk medium) was changed so that the floating height of the head was changed, the half-value width PW50 of the output of an isolated reproductive wave was examined. FIG. 7 shows a result of the examination. The PW50 was measured with a digital oscilloscope (Tektronix TDS544A). As the thickness of the magnetic film decreased, and as the floating height of the magnetic head decreased, the PW50 decreased. A small value of 240 nm was obtained as the PW50 when the thickness of the magnetic film and the floating height of the head were 15 nm and 25 nm respectively. The output measured with a spectral analyzer at the highest linear recording density 300 kFCI was in a range from 2% to 5% of the output of an isolated reproductive wave measured with a digital oscilloscope at 5 kFCI. The output measured by means of the spectral analyzer at the highest linear recording density 300 kFCI was obtained by integrating the odd-number harmonics level till the frequency exceeded 100 MHz. Further, the ratio SLF/Nd of the 0-p output (SLF) of an isolated reproductive wave to cumulative medium noise (Nd) in the case of recording a signal of 300 kFCI was evaluated. The floating quantity of the head was set to be 27 nm. The cumulative medium noise Nd was set to be an integrated value of noise in a frequency band equivalent to 0.5 kFCI to 450 kFCI. FIG. 6 shows a result of the evaluation. In any one of the media, a ratio SLF/Nd of not lower than 25 dB was obtained at a high recording density of 300 kFCI.

Embodiment 4

Layers up to the magnetic layer 16 in the magnetic disk medium having the configuration shown in FIG. 1 were formed in the same manner as that in Embodiment 1. Next, the substrate was moved into a vacuum tank provided with a water-cooling chill plate, and then, nitrogen gas was introduced to cool the substrate to a temperature of 200° C. Next, a protective layer 17 of carbon having a thickness of 12 nm and a lubricant layer 18 containing perfluoroalkyl polyether as a main component were formed successively on the magnetic layer 16 in the same manner as that in Embodiment 1.

After both the magnetic disk medium produced according to this embodiment and the magnetic disk medium produced according to Embodiment 1 were left for 10 hours in an atmosphere under a high-temperature high-humidity condition, that is, under a temperature of 60° C. and humidity of 80%, the error rate in each medium was evaluated by use of the magnetic recording apparatus described in Embodiment 8 and compared with the error rate before the medium was left under the high temperature high-humidity condition. As a result, the error rate of the medium in Embodiment 1 increased by about 40% whereas the change of the error rate of the medium in this embodiment was not larger than 10%. This may be because anticorrosion was improved owing to a fine protective film which was obtained by forming the protective film after cooling the substrate to reduce the temperature thereof.

Embodiment 5

Magnetic disk media were formed in the same manner as that in Embodiment 1 by use of the following materials for the first underlayer 11 of Embodiment 1:

Co-30 at. % Cr-10 at. % Ta,
Co-30 at. % Cr-10 at. % Hf,
Co-30 at. % Cr-9.8 at. % Zr-0.2 at. % Hf,
Co-30 at. % Cr-10 at. % Y,
Co-30 at. % Ti-10 at. % Zr,
Co-20 at. % Ti-15 at. % Zr,
Co-30 at. % V-9.8 at. % Zr-0.2 at. % Hf,
Co-20 at. % Mo-9.9 at. % Zr-0.1 at. % Hf,
Co-20 at. % Nb-9.8 at. % Zr-0.2 at. % Hf,
Co-30 at. % Cr-10 at. % W,
Co-30 wt. % Cr-4.5 wt. % W-1 wt. % C,
Co-30 wt. % Cr-5.5 wt. % W-1.3 wt. % C-1.25 wt. % Fe-2 wt. % Si 3 wt. % Ni,
Ni-30 at. % Cr-10 at. % Zr,
Ni-30 at. % Cr-10 at. % Ta,
Ni-30 at. % Cr-9 at. % Hf,
Ni-30 at. % Cr-9.8 at. % Zr-0.2 at. % Hf,
Ni-30 at. % Cr-10 at. % W,
Ni-20 at. % Nb-10 at. % Y, and
Ni-20 at. % Mo-10 at. % Ta.

The fine structure of the first underlayer in each of the thus obtained media was evaluated in the same manner as that in Embodiment 1. As a result, it was confirmed that the first underlayer formed of any one of the above materials was substantially amorphous. The tackiness of each of the media to the magnetic head slider after CSS was evaluated in the same manner as that in Embodiment 1. As a result, in any one of the media, variation in tackiness was small in comparison with the magnetic disk medium having the second underlayer formed directly on the substrate without formation of such a first underlayer.

Although this embodiment has shown the case where layers for constituting a magnetic recording medium are formed by DC magnetron sputtering, the aforementioned magnetic recording medium could be also formed even in the case where the DC magnetron sputtering is replaced by general RF sputtering or RF magnetron sputtering. In the case where RF sputtering or RF magnetron sputtering is used for forming the second underlayer 12, the density of protrusions is decreased so that a continuous film is formed easily, in comparison with the case where the second underlayer 12 is formed preferably by RF magnetron sputtering rather than general RF sputtering, more preferably by DC magnetron sputtering. This is because variations in height of protrusions can be reduced so that it is possible to easily form a magnetic recording medium which is reliable because of its stable low floating and reduced medium noise. On the contrary, in the case of forming a magnetic layer 16 containing Cr as a component, it is more preferable to use RF magnetron sputtering rather than DC magnetron sputtering, because magnetic phase separation advances easily to thereby reduce medium noise. From the point of view of mass production in a short time, the film-forming speed by general RF sputtering is slower than that by magnetron sputtering even in the case where plasma is converged by a focus coil, or the like. Alternatively, the magnetic recording medium could be formed also by physical vapor deposition such as ion beam sputtering, or the like. From the point of view of high-speed short-time mass production, the producing method by DC magnetron sputtering is best. As is well known, a protective layer containing carbon as a main component can be formed by means of DC magnetron sputtering or chemical vapor deposition (CVD). Further, the first underlayer is formed by means of sputtering so that an element such as Cr which cannot be contained much in the first underlayer by means of plating can be contain ed with a high concentration of 20 atomic % in the first underlayer. Further, higher adhesive strength to the substrate was obtained in comparison with vacuum vapor deposition.

Embodiment 6

As for the magnetic recording medium described in Embodiment 1, a chemically reinforced glass substrate having a thickness of 0.635 mm and a diameter of 2.5 inches was selected as the substrate 10 in the same manner as that in Embodiment 4. After the substrate was cleaned, the following multi-layer film was formed by use of a static opposed type DC in-line sputtering apparatus as described above in the related art. A Co-30 at. % Cr-10 at. % Zr alloy was selected as an alloy target for forming the first underlayer 11. An Al-15 at. % Cr alloy was selected as an alloy target for forming the second underlayer 12. An Ni-20 at. % Cr-8 at. % Zr alloy was selected as an alloy for forming the third underlayer 13. Further, a Cr-20 at. % Ti alloy was selected as an alloy for forming the fourth underlayer 14. A Co-21 at. % Cr-8 at. % Pt alloy was selected as an alloy for forming the magnetic layer. Carbon was selected as a target for forming the protective layer.

The first underlayer 11 having a thickness of 27 nm was formed by means of sputtering. Next, protrusions having a height of about 16 nm and having a density of 400 per 10 $\mu$m square were formed as the second underlayer 12 in an adjacent vacuum tank, after the substrate was heated in an adjacent vacuum tank or without heating the substrate. The third underlayer 13 having a thickness of 25 nm was formed and heated again to 270° C. or higher in an adjacent vacuum tank. Next, the fourth underlayer 14 having a thickness of 15 nm was formed in an adjacent vacuum tank. Further, a magnetic layer 16 having a thickness of 17 nm and a protective layer 17 having a thickness of 10 nm were formed. Next, after the substrate was taken out into the air, a liquid lubricant layer 18 was formed to form a magnetic recording medium.

Three kinds of magnetic recording media, that is, a medium having the substrate not heated, a medium having the substrate heated to 100° C. and a medium having the substrate heated to 250° C. were produced in the aforementioned process in the period between the formation of the first underlayer and the formation of the second underlayer. The fine structure of the first and third underlayers in each of the magnetic disk media formed thus was evaluated by use of a transmission electron microscope in the same manner as that in Embodiment 1. As a result, in the medium having the substrate not heated and in the medium having the substrate heated to 100° C., both the first and third underlayers were substantially amorphous. In the medium having the second underlayer 12 formed after the substrate is heated to 250° C., the first underlayer was amorphous and the third underlayer was mainly microcrystalline, but the grain size of some crystals of the third underlayer was larger than 8 nm and variation in the crystal grain size was large. Even in an alloy taking an amorphous state at a low temperature, microcrystals were grown at a high temperature. As a result, there is the possibility that variation in the crystal grain size of the fourth underlayer may be enlarged even if the third underlayer is formed in a short time.

Discussion about the adhesive mode was made considering the condition that the temperature of the substrate was changed but the electric discharge time was kept constant preparatorily so as to set the height of constituent protrusions of the second underlayer to be about 16 nm. As a result, in the case where the temperature of the substrate was made low and the second underlayer 12 was formed at room temperature without heating, the density of protrusions was made high but the height of protrusions was made relatively small. Accordingly, tacking occurred easily. Further, it became clear that, if the temperature of the substrate was set to be low in order to change the temperature of the substrate so as to form protrusions of the same height, comparatively much electric discharge time or high electric power was required. On the contrary, if the temperature was set to be higher than the temperature for forming the magnetic layer, it became clear that crystallization of the first underlayer was accelerated so that the roughness of the surface was made large. From these results, it is necessary to control the temperature for forming protrusions of roughness higher than the room temperature but lower than the temperature for accelerating the crystallization of the third underlayer formed on the rough protrusions.

Embodiment 7

Figure 8:
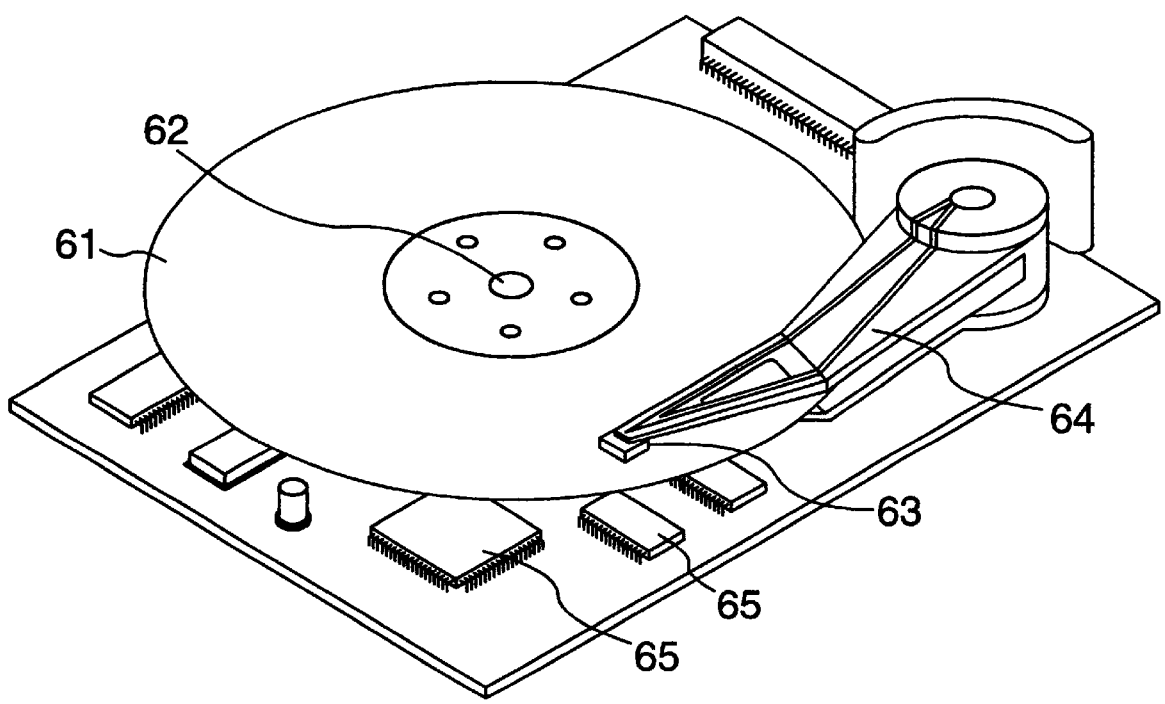
FIG. 8 schematically shows an example of a magnetic recording apparatus according to the present invention.

A magnetic recording apparatus comprising a magnetic recording medium 61 described in Embodiments 1 through 6, a driving portion 62 for driving the magnetic recording medium, a magnetic head 63 including a recording portion and a reproducing portion, means 64 for moving the magnetic head relative to the magnetic recording medium, and a recording/reproducing signal processing means 65 for processing a recording signal to the magnetic head and a reproducing signal from the magnetic head, was configured as shown in FIG. 8.

Figure 9:
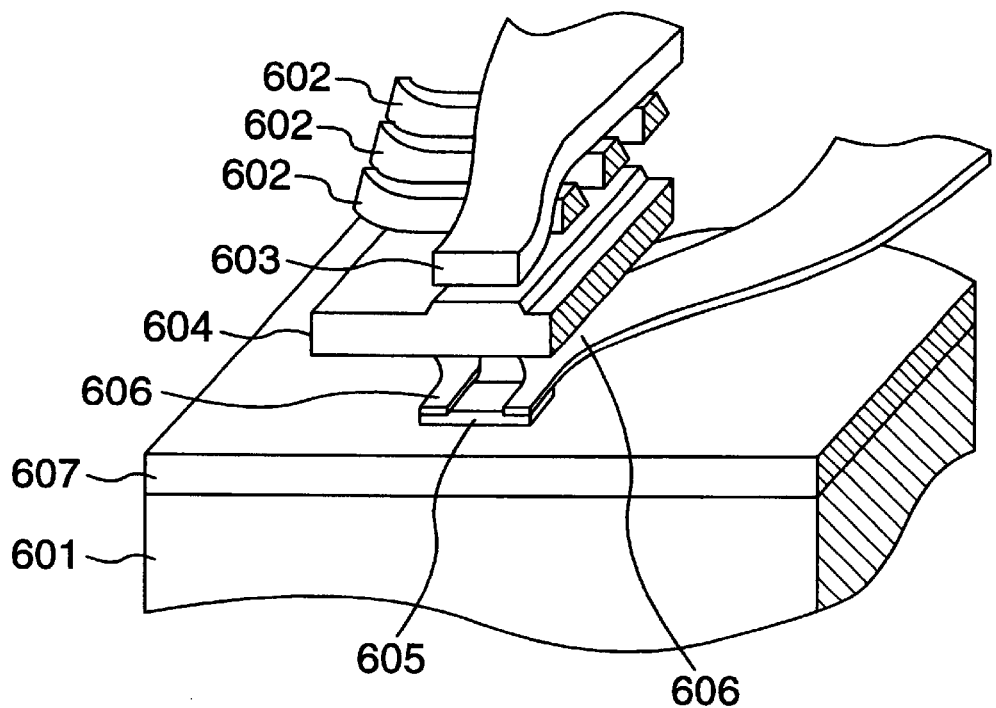
FIG. 9 is a perspective view showing an example of the structure of a magnetic head in a magnetic recording apparatus according to the present invention.

The reproducing portion of the magnetic head 63 was assumed to be constituted by a magneto-resistance effect type magnetic head. FIG. 9 is a perspective view typically showing the magnetic head used for measurement. This head was a combination type head, including an inductive magnetic head for recording and a magneto-resistance effect type head for reproducing, which was formed on the base 601. The recording head had an upper recording pole 603, and an upper shield layer 604 which served also as a lower recording pole. Coils 602 were sandwiched between the upper recording pole 603 and the lower recording pole 604. The gap length between the recording poles was set to be 0.3 $\mu$m. Copper having a thickness of 3 $\mu$m was used as the coil. The reproducing head had a magneto-resistance sensor 605, and electrode patterns 606 at opposite ends of the magneto-resistance sensor 605. The magneto-resistance sensor was sandwiched between the lower recording pole and upper shield layer 604 and the lower shield layer 607, each of which had a thickness of 1 $\mu$m. The distance between the shield layers was 0.20 $\mu$m. Incidentally, the gap layer between the recording poles and the gap layer between each shield layer and the magneto-resistance sensor are not shown in FIG. 9.

Figure 10:
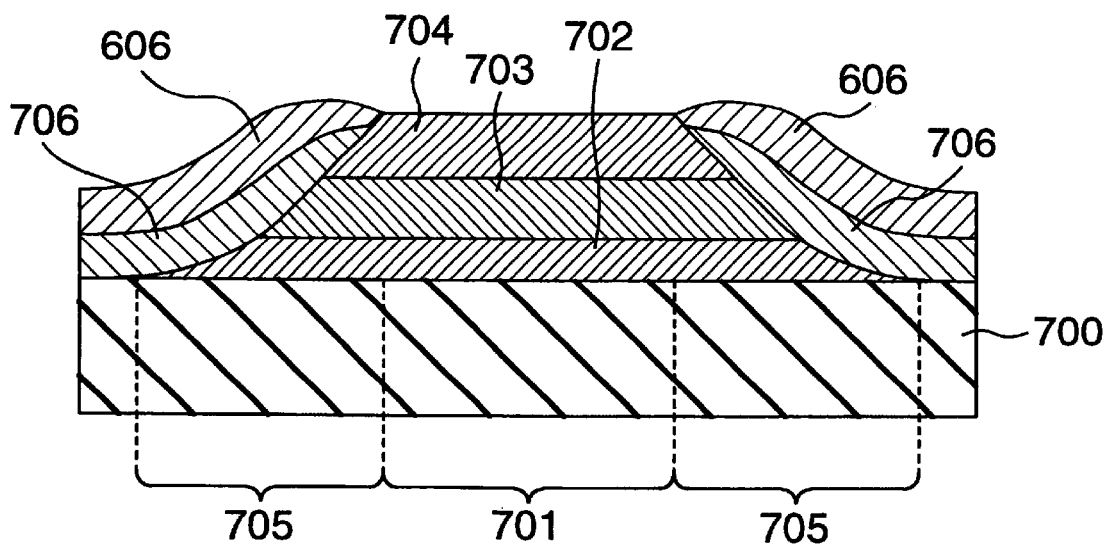
FIG. 10 is a sectional view showing an example of the structure of a magneto-resistance sensor of a magnetic head in a magnetic recording apparatus according to the present invention.

FIG. 10 shows the sectional structure of the magneto-resistance sensor. A signal detection region 701 of the magnetic sensor includes a portion in which a lateral bias layer 702, a separation layer 703 and a magneto-resistance ferromagnetic layer 704 are formed successively on a gap layer 700 of aluminum oxide. A 20-nm-thick Ni—Fe alloy was used as the magneto-resistance ferromagnetic layer 704. Although a 25-nm-thick Ni—Fe—Nb alloy was used as the lateral bias layer 702, any ferromagnetic alloy such as Ni—Fe—Rh, or the like, may be used if the ferromagnetic alloy is relatively high in electric resistance and good in soft magnetic characteristic. The lateral bias layer 702 is magnetized in the in-face direction of the film (lateral direction) perpendicular to the sense current flowing in the magneto-resistance ferromagnetic layer 704 on the basis of the magnetic field generated by the sense current, so that a lateral bias magnetic field is applied to the magneto-resistance ferromagnetic layer 704. Accordingly, a magnetic sensor exhibiting a linear reproductive output with respect to the magnetic field leaked from the medium is obtained. Ta relatively high in electric resistance was used for the separation layer 703 for preventing the splitting of the sense current from the magneto-resistance ferromagnetic layer 704. The film thickness of the separation layer 703 was set to be 5 nm.

Taper portions 705 are provided at opposite ends of the signal detection region. The taper portions 705 have permanent magnet layers 706 for making the magneto-resistance ferromagnetic layer 704 be a single magnetic domain, and a pair of electrodes 606 for taking out a signal formed thereon. The permanent magnet layers 706 are required to have large coercivity so that the direction of magnetization is hardly changed. An alloy such as Co—Cr, Co—Cr—Pt, or the like, is used as the permanent magnet layers 706.

The magnetic recording medium described in Embodiments 1 through 6 was combined with the head shown in FIG. 9 to thereby form a magnetic recording apparatus shown in FIG. 8. As a result, in a floating system in which the magnetic floating height hm was in a range from about 62 nm to about 68 nm, if the product (Br×t) of the thickness t of the magnetic layer and the residual flux density Br measured by application of the magnetic field in the direction of running of the magnetic head relative to the magnetic recording medium at the time of recording exceeded 9.6 mA (120 Gauss·$\mu$m), sufficient writing could not be performed so that the overwriting characteristic was deteriorated and the output in a high linear recording density region was lowered. On the contrary, if the product (Br×t) was smaller than 3.2 mA (40 Gauss·μm), the reduction of the reproductive output of the recording layer of the medium might be recognized in accordance with the composition or thickness when the medium was left at room temperature for 7 days. Accordingly, the magnetic recording apparatus was formed so that the product (Brxt) of the thickness t of the magnetic layer of the magnetic recording medium described in Embodiments 1 through 6 and the residual flux density Br measured by application of the magnetic field in the direction of running of the magnetic head relative to the magnetic recording medium at the time of recording was in range from 3.2 mA (40 Gauss·μm) to 9.6 mA (120 Gauss·μm), both inclusive.

In the case where the magneto-resistance sensor portion of the magneto-resistance effect type magnetic head used a head formed between two shield layers which were made of a soft magnetic substance and separated from each other by a distance larger than 0.2 μm, a sufficient reproductive output could not be obtained if the highest linear recording density exceeded 220 kFCI. If the distance between the two shield layers of a soft magnetic substance was smaller than 0.12 μm, device formation could not be made easily because of difficulty in processing. From these results, the magnetic recording apparatus was formed by use of the head formed between the two shield layers made of a soft magnetic substance and separated from each other by a distance in a range from 0.12 μm to 0.2 μm. By the magnetic recording apparatus configured thus, a recording density higher than 4 Gbits per square inch could he achieved.

Embodiment 8

A magnetic recording apparatus was formed to have the same configuration as that in FIG. 8, except that the magneto-resistance effect type magnetic head used in Embodiment 7 was replaced by a magneto-resistance sensor (spin valve type reproducing device) which includes a plurality of electrically conductive magnetic layers for generating a large resistance change due to relative change of the respective directions of magnetization of the electrically conductive magnetic layers on the basis of the external magnetic field, and an electrically conductive non-magnetic layer disposed between the electrically conductive magnetic layers.

Figure 11:
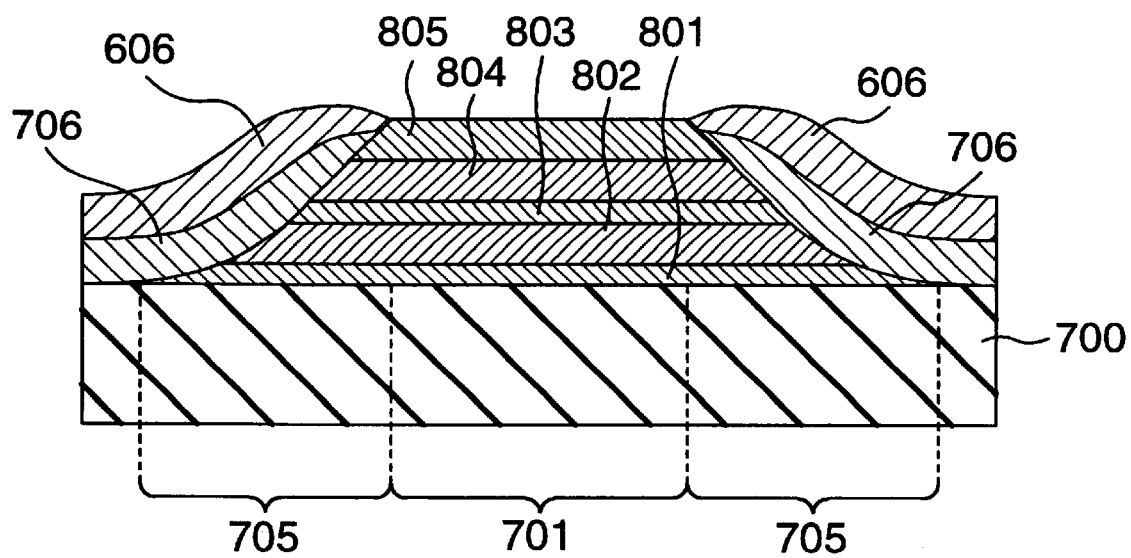
FIG. 11 is a sectional view showing another example of the structure of a magneto-resistance sensor of a magnetic head in a magnetic recording apparatus according to the present invention.

FIG. 11 is a sectional view showing the magneto-resistance sensor. This sensor has a structure in which a 5-nm-thick Ta buffer layer 801, a 7-nm-thick first magnetic layer 802, a 1.5-nm-thick intermediate phase 803 of copper, a 3-nm-thick second magnetic layer 804 and a 10-nm-thick antiferromagnetic alloy layer 805 of Fe-50 at. % Mn are formed successively on a gap layer 700. An Ni-20 at. % Fe alloy was used for the first magnetic layer. Cobalt was used for the second magnetic layer 804. The magnetization of the second magnetic layer 804 is fixed in one direction by the exchange magnetic field from the antiferromagnetic layer 805. On the other hand, the direction of magnetization of the first magnetic layer 802 brought in contact with the second magnetic layer 804 through the non-magnetic layer 803 is changed by the magnetic field leaked from the magnetic recording medium 61, so that the change of resistance occurs.

The change of resistance, caused by the relative changes of the directions of magnetization, of such two magnetic layers is called the "spin valve effect". In this embodiment, a spin valve type magnetic head utilizing this effect was used as the reproducing head. Taper portions 705 have the same configuration as the magnetic sensor in Embodiment 7.

The value of product (Brxt) of the magnetic recording medium used for measurement was set to be 3, 3.2, 4, 6, 8, 10, 12 and 14 mA. If the value (Brxt) was set to be 3 mA (37.5 Gauss·μm), the reduction of the reproductive signal with the passage of time was remarkable and preferable coercivity was hardly obtained in practical use. It became clear that, if the value (Brxt) was larger than 12 mA (150 Gauss·μm), the output of an isolated bit was large but the tendency of reduction of the output resolution was undesirably remarkable.

Further, when such a spin valve type reproducing head was used, a signal recorded at the highest linear recording density more than 300 kFCI was reproduced stably to obtain a signal output, as described in Embodiment 3. In this embodiment, a magnetic head in which a magneto-resistance effect type magnetic head was formed on a magnetic head slider having a floating surface rail area of not larger than 1.4 mm$^2$ and a mass of not larger than 2 mg was used. By setting the floating surface rail area of the slider to be not larger than 1.4 mm$^2$ and the mass thereof to be not larger than 2 mg, reliability of shock resistance could be improved. In such a manner, both a high recording density and a high shock resistance could be attained simultaneously. Accordingly, mean time between failures (MTBF) of not shorter than 300,000 hours could be achieved at the recording density of 5 Gbits or more per square inch.

Comparative Example 1

A magnetic recording medium was formed in the same manner as that in Embodiment 3 in which the thickness of the magnetic layer was set to be 21 nm, except that the composition of the target for forming the first underlayer was changed. Four kinds of targets, namely, Al-30 at. % Si, SiO$_2$, B4C, and Ti-20 at. % Cr-10 at. % Zr were used as the target for forming the first underlayer. Thus, four kinds of magnetic recording media were produced. The tackiness of each of the thus produced magnetic disk media to the head slider after CSS was evaluated in the same manner as that in Embodiment 3 and compared with that of the medium of Embodiment 3. In the medium of Embodiment 3, the tackiness was hardly changed from its initial value even after CSS was repeated 50,000 times. On the contrary, in the medium of this embodiment in which B4C was used as the first underlayer, crashing occurred so that both the surface of the medium and the frictional surface of the head slider were destroyed after CSS was repeated 10,000 times. Further, in the medium in which Al-30 at. % Si, SiO$_2$ or Ti-20 at. % Cr-10 at. % Zr was used as the first underlayer, crashing could be avoided even after CSS was repeated 50,000 times. However, the tackiness was increased by about 3–7 gf in comparison with its initial state, so that scratches caused by the frictional motion of the head slider were found here and there on the surface of the medium. As described above, in the medium samples produced in this comparative example, a problem with frictional motion occurred in an early stage in comparison with the medium of Embodiment 3. It is apparent that the magnetic recording medium of Embodiment 3 has both excellent recording/reproducing characteristic in a high recording density region and excellent reliability on durability against frictional motion simultaneously.

Comparative Example 2

Magnetic recording media were formed in the same manner as that in Embodiment 3 in which the thickness of the magnetic layer was set to be 21 nm, except that the height of protrusions constituting the second underlayer in a range from 2 to 32 nm was changed. The magnetostatic characteristic of these media hardly depended on the height-of the protrusions. That is, the magnetostatic characteristic of these media was substantially equivalent to the characteristic of the media of Embodiment 3 shown in FIG. 6. If the height of the protrusions and Ra were set to be not smaller than 30 nm and not smaller than 4 nm respectively, there was a problem that noise increased in the case where the floating quantity of the head was set to be not larger than 48 nm. Further, if the height of the protrusions and Ra were set to be not larger than 4 nm and not larger than 0.5 nm respectively, in some cases, the magnetic head slider adhered to the surface of the medium in the CSS test.

Embodiment 9

Figure 12:
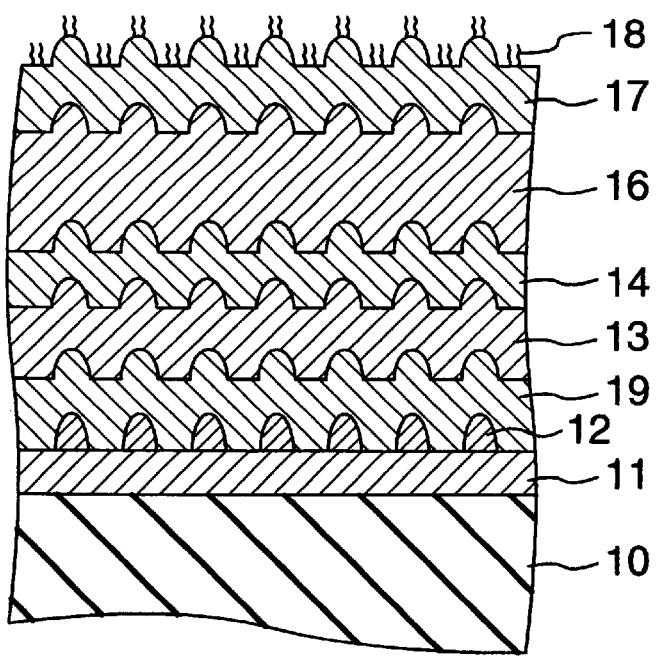
FIG. 12 is a sectional view schematically showing a magnetic recording medium according to a further embodiment of the present invention.

FIG. 12 is a view showing the sectional structure of the magnetic recording medium in this embodiment. In this embodiment, the medium has a structure in which an intermediate underlayer 19 is interposed between the second and third underlayers 12 and 13 of the medium of Embodiment 3 (or Embodiment 1) shown in FIG. 1. After layers up to the second underlayer 12 were formed in the same manner as that in Embodiment 3, the intermediate underlayer 19 of Cr having a thickness of 30 nm was formed. Then, the third underlayer 13 and layers above the layer 13 were formed in the same manner as that in Embodiment 1. The thickness of the magnetic layer was set to be 17 nm.

The recording/reproducing characteristic of the medium obtained thus was evaluated in the same manner as that in Embodiment 3. As a result, there was obtained a characteristic which was substantially equivalent to that of the medium in Embodiment 3 in which the thickness of the magnetic layer was set to be 17 nm. After evaluation on the tackiness to the head slider after CSS in the same manner as that in Embodiment 1, in the medium in Embodiment 3, it was confirmed that the tackiness increased by about 3 gf after repetition of CSS 100,000 times. On the contrary, in the medium in this embodiment, the increase of tackiness was hardly observed. By interposition of the intermediate underlayer 19 of Cr between the second and third underlayers 12 and 13 in such a manner, reliability of durability against frictional motion was improved more greatly. A similar effect was obtained also in the case where Mo, or W, or an alloy such as Cr—Ti, Cr—Mo, or the like, was used as a material for forming the intermediate underlayer . In this embodiment, the medium, however, requires a new target and a vacuum tank for forming the intermediate underlayer.

Embodiment 10

A magnetic recording medium having the same configuration as that in Embodiments 1 and 3 was produced in the same manner as that in Embodiment 1, except that the alloy material for forming the first underlayer was different. The same Ni-20 at. % Cr-10 at. % Zr alloy as used in the third underlayer was used as the alloy material for forming the first underlayer. Further, the thickness of the magnetic layer was set to be 17 nm. The recording/reproducing characteristic of the medium obtained thus was evaluated in the same manner as that in Embodiment 3. As a result, there was obtained a characteristic substantially equivalent to that of the medium in Embodiment 3 in which the thickness of the magnetic layer was set to be 17 nm. Further, the medium was subjected to a dust-introduction test in the same manner as that in Embodiment 1. A good result was obtained so that crashing did not occur when seeking was repeated up to 200 times in the same manner as that in the medium of Embodiment 1. Further, the tackiness of the surface of the medium to the head slider after CSS was evaluated in the same manner as that in Embodiment 1. As a result, it was confirmed that the tackiness increased by about 5 gf after CSS was repeated 100,000 times. On the contrary, in the medium of Embodiment 1, the increase of the tackiness was about 3 gf. In such a manner, the medium in this embodiment, in which the first and third underlayers were both made of an Ni—Cr—Zr alloy, was slightly inferior (as shown by the result of a long-term CSS test of 100,000 times repetition) to the medium in Embodiment 1 in which the first and third underlayers were made of a Co—Cr—Zr alloy and an Ni—Cr—Zr alloy respectively. The medium in this embodiment, however, had no problem in practical use.

Embodiment 11

The following materials for forming the third underlayer in the medium of Embodiment 1 were used to form magnetic disk media in the same manner as that in Embodiment 1:

Ni-30 at. % Cr-10 at. % Ta,
Ni-30 at. % Cr-9 at. % Hf,
Ni-30 at. % Cr-9.8 at. % Zr-0.2 at. % Hf,
Ni-30 at. % Cr-10 at. % W,
Ni-20 at. % Nb-10 at. % Y, and
Ni-20 at. % Mo-10 at. % Ta.

The fine structure of the third underlayer in each of the media obtained thus was evaluated in the same manner as that in Embodiment 1. As a result, it was confirmed that the third underlayer made of any one of the above materials was substantially amorphous. These media were subjected to a dust-introduction test in the same manner as that in Embodiment 1. As a result, in any one of the media, the number of seeking times to cause crashing increased to three times or more in comparison with the magnetic disk medium having the third underlayer of Co-30 at. % Cr-10 at. % Zr. That is, the media in this embodiment were excellent in durability against frictional motion.

As described above, in the magnetic recording medium according to the present invention, not only can the variation and change of tackiness in contact-start-stop be reduced, but also the friction durability characteristic in a dust introduction test can be improved. Furthermore, the magnetic recording medium according to the present invention has a characteristic such that noise in a high recording density region is low. Accordingly, the present invention is adapted for a small-sized magnetic recording apparatus achieving a large storage capacity and high reliability.

What is claimed is:

1. A magnetic recording medium comprising:
   a base;
   a first underlayer formed over said base;
   a second underlayer formed on said first underlayer and having a plurality of protrusions with a predetermined density;
   a third underlayer formed over said second underlayer and including an alloy containing Ni, at least one element selected from a first group consisting of Cr, Ti, V, Mo and Nb, and at least one element selected from a second group consisting of Zr, Ta, Hf, Y and W, wherein Ni is present in an atomic percent greater than any other element in said third underlayer alloy;
   a fourth underlayer formed on said third underlayer; and
   a magnetic layer formed over said fourth underlayer;
   wherein said first underlayer includes an alloy containing a selected one of Co and Ni, at least one element selected from the first group consisting of Cr, Ti, V, Mo and Nb, and at least one element selected from the second group consisting of Zr, Ta, Hf, Y and W, wherein said selected one of Co and Ni is present in an amount greater than any other element in said first underlayer alloy; and wherein said second underlayer includes a selected one of Al and an alloy containing Al in an amount greater than any other element in said second underlayer alloy.

2. A magnetic recording medium according to claim 1, wherein said fourth underlayer includes an alloy containing Cr, and at least one element selected from a group consisting of Ti, V, Mo and Si, wherein Cr is present in an amount greater than any other element in said fourth underlayer alloy.

3. A magnetic recording medium according to claim 1, wherein said magnetic layer includes an alloy containing Co, Pt, and at least one element selected from a group consisting of Cr, Ta, $SiO_2$, Nb, V and Ti, wherein Co is present in an amount greater than any other element in said magnetic alloy.

4. A magnetic recording medium according to claim 1, wherein said first underlayer is Co—Cr—Zr alloy, said second underlayer is Al—Cr alloy, and said third underlayer is Ni—Cr—Zr alloy.

5. A magnetic recording medium according to claim 1, wherein said first underlayer is Ni—Cr—Zr alloy, said second underlayer is Al—Cr alloy, and said third underlayer is Ni—Cr—Zr alloy.

6. A magnetic recording medium according to claim 1, wherein said first underlayer and said third underlayer are Ni—Cr—Zr alloys.

\* \* \* \* \*